J. R. HARBECK.
COMBINED GLOBE AND BANK.
APPLICATION FILED AUG. 8, 1912.

1,196,108.

Patented Aug. 29, 1916.

Witnesses:
Wm. Geiger

Inventor:
Jervis R Harbeck
By Munday, Evarts, Adcock & Clarke,
Attys.

UNITED STATES PATENT OFFICE.

JERVIS R. HARBECK, OF CHICAGO, ILLINOIS, ASSIGNOR TO CHARLES W. SHONK COMPANY, OF CHICAGO, ILLINOIS, A CORPORATION OF NEW JERSEY.

COMBINED GLOBE AND BANK.

1,196,108.  Specification of Letters Patent.  Patented Aug. 29, 1916.

Application filed August 8, 1912. Serial No. 713,968.

*To all whom it may concern:*

Be it known that I, JERVIS R. HARBECK, a citizen of the United States, residing in Chicago, in the county of Cook and State of Illinois, have invented a new and useful Improvement in Combined Globes and Banks, of which the following is a specification.

This invention relates to an improved toy sheet metal globe and savings bank for children, and the invention consists in the novel devices and combinations of parts and devices hereinafter more fully set forth and made the subject matter of claims.

Figure 1:
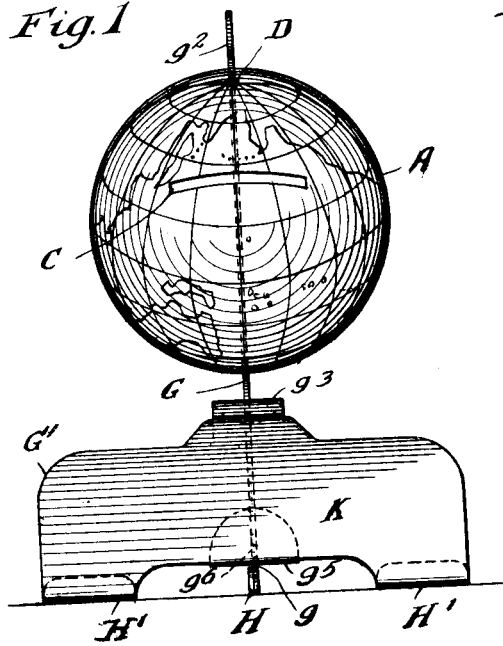
Figure 2:
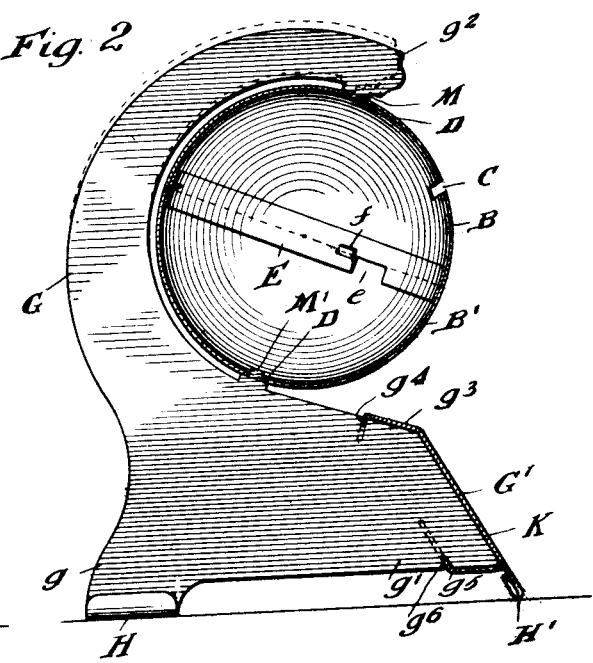
Figure 3:
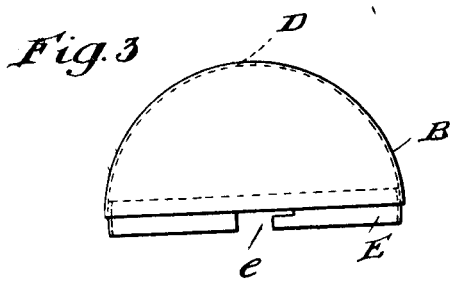
Figure 5:
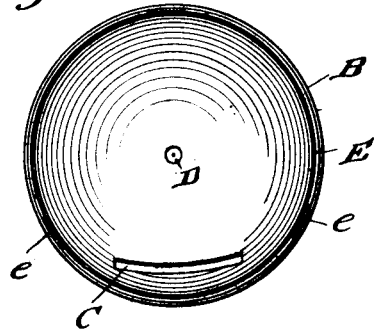
Figure 4:
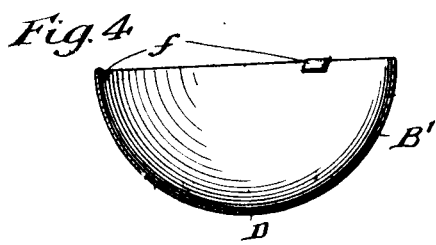

In the accompanying drawing which forms a part of this specification, Figure 1 is a front elevation of my improved sheet metal toy globe and savings bank; Fig. 2 is a side elevation, partly in section, of the same. Fig. 3 is an external view of the upper hemisphere of the hollow sheet metal globe. Fig. 4 is a vertical section of the lower hemisphere and Fig. 5 is a bottom view of the hemisphere shown in Fig. 3.

The aim is to produce a cheap, easily made sheet metal structure which may simultaneously serve in some measure the educational purposes of a globe to illustrate the motions, the seasons and the geography of the earth, as a child's saving bank, and as an advertising medium, to be given away by the advertiser. A prime consideration in such a case is, of course, a structure that will adequately answer these various purposes and which at the same time may be produced at a very small cost, and the present construction is especially designed to meet all these various conditions.

In the drawing, A is the globe, having on its exterior a map of the world, said globe being stamped up out of two hemispheres B, B¹, of sheet metal, to be joined together and mounted as presently to be described. The upper or northern hemisphere, B, is cut with a slot C through which the coins may be inserted in the use of the device as a savings bank. At the pole in each hemisphere is cut an axial opening D to receive a stud of the stand, upon which studs the globe properly positioned may be rotated to illustrate the diurnal motion of the earth; said studs being properly inclined to show or indicate the seasonal succession, in the earth's movement about the sun. The two hemispheres B, B¹, are joined together by an inset collar E fastened to one hemisphere, entering at the equator of the other and secured by several bayonet joints formed by L shaped slots *e* cut in the collar, and studs or tangs *f* on the lip of the other hemisphere. This joint,—when the globe is not mounted on its frame or stand,—permits the two hemispheres to be separated from each other and the bank thus to be opened for the removal of its contents, which opening, however, cannot take place as long as the globe is mounted in its frame or stand.

The frame or stand is shown as formed of two pieces of sheet metal, the upright G, and the cross, or base piece, G¹. The upright piece has a rear foot *g*, a forward projection *g*¹ and an arcuate globe embracing arm *g*². The base or cross piece G¹ at its middle portion has an upper bent extension *g*³ to enter a slot *g*⁴ in the upright and is in turn centrally slotted to receive the upper edge of said upright, and said base has a lower bent extension *g*⁵ to enter a slot *g*⁶ in the upright. These slots in the two parts permit the base and the upright to be sprung together and thus securely joined; and when so joined the two parts make a stand or tripod with three feet, one, H, at the rear and two H¹, H¹ in front, thus making without rivets or solder a firm frame or stand upon which to support the globe. The base or cross piece G¹ has a broad, flat, somewhat inclined tabular face K admirably suited to printed advertising matter used in connection with the device.

On the encircling arm of the upright piece, are formed the integral axial studs M, M¹ fitted to enter axial openings D, D in the globe. To mount the globe or put the globe and stand together, it is only necessary to spring the encircling arm slightly, as indicated by the dotted lines in Fig. 2, the resiliency of the sheet metal of said arm being sufficient to permit this operation, and to hold the globe afterward and allow it to freely turn on said studs.

I claim:—

1. In a device of the character described, a tripod stand comprising a transverse front panel formed with upper and lower bent extensions, and a base member arranged in a plane extending rearward from the front panel, formed with slits in which said bent extensions are engaged, and having an arcuate arm formed with integral axial studs.

2. In a device of the character described, a tripod stand comprising a transverse front panel formed with upper and lower bent extensions, and a base member arranged in a plane extending rearward from the front panel, formed with slits in which said bent extensions are engaged, and having an arcuate arm formed with integral axial studs, and a hollow and slotted globe member mounted on said axial studs.

3. A device of the character described including, in combination: a stand having a vertical, curved arm formed of sheet metal and provided with integral studs arranged in axial alinement; and a globe having axially alined recesses therein in which said studs are adapted to be placed, the diameter of the globe being slightly greater than the distance between said studs and the sheet metal curved arm permitting the studs to be sprung into place, substantially as specified.

JERVIS R. HARBECK.

Witnesses:
PEARL ABRAMS,
H. M. MUNDAY.